United States Patent [19]

Simon et al.

[11] Patent Number: 5,861,506
[45] Date of Patent: Jan. 19, 1999

[54] COMPOSTABLE AND THERMOPLASTIC CELLULOSE ETHER-2-HYDROXYCARBOXYLIC ACID ESTERS AND MIXED ESTERS

[75] Inventors: Joachim Simon, Düsseldorf; Hanns Peter Müller, Odenthal; Rainhard Koch, Köln; Dirk Jacques Dijkstra, Köln; Jürgen Engelhardt, Fallingbostel; Volkhard Müller, Bomlitz, all of Germany

[73] Assignee: Wolff Walsrode AG, Walsrode, Germany

[21] Appl. No.: 852,456

[22] Filed: May 7, 1997

[30] Foreign Application Priority Data

May 10, 1996 [DE] Germany ............ 196 18 826.1

[51] Int. Cl.$^6$ .............. C08B 13/00; C08C 1/26; D01F 2/28

[52] U.S. Cl. .............................. 536/66; 536/116
[58] Field of Search ...................... 536/66, 116

[56] References Cited

U.S. PATENT DOCUMENTS 5,466,794  11/1995  Kalbe et al. .................. 536/66

*Primary Examiner*—Nathan M. Nutter
*Attorney, Agent, or Firm*—Sprung Kramer Schaefer & Briscoe

[57] ABSTRACT

Thermoplastic and compostable cellulose ether esters with 2-hydroxycarboxylic acids as acid components and mixed esters which, in addition to 2-hydroxycarboxylic acid groups, have further mono-, dicarboxylic acid or carbamate groups.

10 Claims, No Drawings

COMPOSTABLE AND THERMOPLASTIC CELLULOSE ETHER-2-HYDROXYCARBOXYLIC ACID ESTERS AND MIXED ESTERS

The present invention relates to new thermoplastic and compostable cellulose ether esters with 2-hydroxycarboxylic acids as acid components and to mixed esters which contain, in addition to 2-hydroxycarboxylic acid groups, further mono-, dicarboxylic acid or carbamate groups.

On the one hand, biodegradable materials must satisfy stringent technical requirements as regards extrudability, water resistance and mechanical properties. On the other hand, full biodegradability under composting conditions within a rotting cycle of 3 months (compostability) is a prerequisite for disposal by way of composting.

Cellulose-2-hydroxycarboxylic acid esters are already known. Cellulose esters which are prepared by reaction of cellulose with lactide or glycolide in cellulose-specific solvent systems such as dimethyl acetamide/LiCl are described in DE 33 22 118. This method is successful only for the synthesis of water-soluble cellulose derivatives with a low degree of substitution which are used as coatings or consistency regulators. In view of their solubility in water and lack of thermoplasticity, such cellulose esters are unsuitable for the preparation of films and moulded parts with satisfactory use properties.

DE 4 317 231 describes the preparation of cellulose ether ester mixed graft polymers from damp alkali cellulose in a one pot reaction by successive addition of alkene oxides and lactones. Although water-insoluble products with thermoplastic properties may thereby be prepared, large quantities of by-products are always formed under such reaction conditions. In the case of such by-products—chiefly a homopolymer of lactone—compostability can be assumed. The range of the degree of substitution in which the cellulose derivative displays thermoplasticity and complete biological degradability within the normal rotting cycle of 12 weeks in the compost was not mentioned.

The rate of biological degradation of conventional cellulose derivatives depends on the degree of substitution of each saccharide unit (see J. G. Batelaan in The Handbook of Environmental Chemistry, Volume 3, part F, Ed. O. Hutzinger, Springer-Verlag, 1992, 229–336, M. G. Wirick, Journal of Polymer Science, Part A-1, 6(1968), 1705–1718). All the industrially available cellulose derivatives are thus sufficiently rapidly biodegradable only with average degrees of substitution of less than 1.0. Thermoplasticity, on the other hand, can be achieved with known derivatives such as e.g. cellulose acetate, only with degrees of substitution greater than 2.5 (T. Eicher, in Ullmanns Encyklopädie der technischen Chemie, 4th edition, 9, 1975, 227–246).

Accordingly, the object of the present invention is the synthesis of water-insoluble and thermoplastic cellulose derivatives which are fully biodegradable within 3 months under composting conditions.

This object is achieved according to the invention by reaction of cellulose ethers with the cyclic dimers of 2-hydroxycarboxylic acids such as for example with D-, DL- and L-lactide and with oligomers of 2-hydroxycarboxylic acids, such as for example with lactic acid oligomers containing 2 to 10 lactic acid units. Moreover, the aim is achieved by the synthesis of new types of mixed cellulose ether esters which contain, in addition to 2-hydroxycarboxylic acid groups, further dicarboxylic acid groups, monocarboxylic acid groups or carbamate groups.

It was ascertained that cellulose ethers with degrees of substitution of less than 1 in conventional organic solvents such as e.g. dioxane, dimethyl acetamide or tert.-butanol may be reacted with the cyclic dimers of 2-hydroxycarboxylic acids to form cellulose ether esters with total degrees of substitution greater than 3. Specific solvent systems for cellulose such as DMAc/LiCl are not required for this purpose.

The cellulose ether-2-hydroxycarboxylic acid esters according to the invention are water-insoluble and thermoplastic if the molecular degree of substitution with 2-hydroxycarboxylic acid per anhydroglucose repeating units is greater than 3. Surprisingly, despite their high total degree of substitution, these cellulose ether esters are fully biodegradable within 3 months under composting conditions. In particular, hydroxypropylcellulose lactates also exhibit good optical and mechanical properties and are similar in this respect to conventional polystyrene. As a result of mixed substitution with further monocarboxylic acid, dicarboxylic acid and carbamate groups, the thermoplasticity, mechanical properties and sensitivity to water of the cellulose ether esters can be varied widely. If the sum of the degrees of substitution of the ether and of the mixed substituent does not exceed 2, the mixed esters are also fully compostable.

It is therefore possible to prepare for the first time highly substituted, thermoplastic and fully compostable cellulose derivatives, the material properties of which are comparable with the properties of standard plastics.

The cellulose ether esters that can be prepared according to the invention can be described by the general structure (I)

wherein cell-O represents the substituted radical of a hydroxyl group on the cellulose chain and at least one of the groups A is a 2-hydroxycarboxylic acid having the structure (II).

$D_1$ and $D_2$ independently of one another stand for a hydrogen atom or a methyl or ethyl group, m stands for an integer from 1 to 10.

B is a polymeric ether group having the general structure (III)

wherein E stands for an aliphatic branched or unbranched chain with 2 to 4 C atoms and n is an integer from 1 to 5. In the event that n equals 0, at least one of the groups A must be a methyl, ethyl, benzyl, carboxyalkyl, sulphoalkyl or cyanoethyl group.

If mixed esters are present, then at least one of the groups A is a 2-hydroxycarboxylic acid having the structure (II) and at least one further group A is a monocarboxylic acid, a dicarboxylic acid or a carbamate group. The sum of the degrees of substitution of the groups B and A is less than 2 for all the substituents which are not 2-hydroxycarboxylic acid groups. The remainder of the groups A are hydroxyl groups.

For the synthesis of these cellulose ether esters, a suspension of the cellulose ethers is formed in an organic solvent and a catalyst is added thereto. The cyclic dimer of the 2-hydroxycarboxylic acid is then added and the mixture stirred for 1 to 10 hours, preferably for 2 to 5 hours at reaction temperatures between 50° and 150° C., preferably between 80° and 130° C. The mixed substitution takes place in the same way, except that, in addition to the cyclic dimer of the 2-hydroxycarboxylic acid, a monocarboxylic anhydride, dicarboxylic anhydride or isocyanate is additionally caused to react.

Suitable cellulose ethers are, for example, alkyl and aryl celluloses such as, e.g. methyl cellulose, ethyl cellulose, benzyl cellulose, cyanoethyl cellulose, hydroxybutyl cellulose, hydroxyethyl cellulose, hydroxypropyl cellulose and mixed ethers thereof and also ionic cellulose ethers such as carboxyalkyl cellulose or sulphoalkyl cellulose. The degrees of substitution are less than or equal to 1.5, preferably less than 1.

Suitable cyclic dimers of 2-hydroxycarboxylic acids are, in particular, glycolide, lactide and the cyclic dimers of 2-hydroxy-n-butyric acid and 2-hydroxyisobutyric acid.

Dicarboxylic anhydrides suitable for mixed substitution are alkane or alkene succinic anhydrides, phthalic anhydride, tetrahydrophthalic anhydride, succinic anhydride and maleic anhydride and its addition products with fatty acids.

Monocarboxylic anhydrides suitable for mixed substitution are acetic, propionic and butyric anhydride.

Aliphatic isocyanates are also suitable for mixed substitution, e.g. butyl isocyanate and stearyl isocyanate.

Suitable suspension agents or solvents are ketones, ethers and cyclic ethers, acetals, hydrocarbons and polar aprotic compounds such as dimethyl sulphoxide, dimethyl formamide, dimethyl acetamide, dioxane, tetrahydrofuran, N-methylmorpholine, N-methylmorpholine oxide, N-methyl pyrrolidone, dimethoxymethane, dimethyl ether, diethylene glycol dimethylether, and also protic solvents such as e.g. tert.-butanol.

The reaction may be carried out with basic, coordination or acid catalysis.

The catalysts used may be amines such as triethylamine and 1,8-diazabicyclo[5.4.0]undec-7-ene or basic metal salts such as sodium acetate, sodium carbonate, potassium acetate, potassium carbonate and lithium carbonate. Moreover, tin and zinc salts of the kind normally used for the synthesis of polylactide are also suitable. In the case of an acid catalysis, strong mineral acids such as e.g. concentrated sulphuric acid, toluenesulphonic acid or perchloric acid are suitable.

By varying the cellulose ether taken as a basis and the combination of ester groups and by selecting suitable degrees of substitution, it is possible to obtain thermoplastic cellulose ether esters which are fully biodegradable within 3 months under composting conditions and with melting points between 100° and 190° C. and which can be processed with the conventional processing techniques for thermoplastics such as extrusion, injection moulding or blow moulding.

Cellulose ether-2-hydroxycarboxylic acid esters are characterised by stiffness and strength and by transparency and gloss. With regard to their material properties, they are similar to conventional, non-compostable polystyrene.

They are suitable for the preparation of biodegradable films, fibres, pots, bottles and other moulded articles and may be varied in terms of their properties by the preparation of blends of any composition with other biodegradable components such as e.g. starch, cellulose, polylactide, glycolide, polyhydroxybutyric acid, polyhydroxyvaleric acid, polycaprolactone, polyester amides, copolyesters or polyester urethanes. The modification with auxiliaries such as e.g. plasticisers, antioxidants, weathering stabilisers, flame retardants, dyes or pigments is possible. Moreover, it is possible to prepare compostable anisotropic fibrous composites by introducing natural fibres such as flax, ramie or hemp.

The polysaccharide derivatives described are soluble in organic solvents such as e.g. DMSO, DMAc, dioxane, THF or acetone.

The new cellulose ether esters according to the invention are suitable for the preparation of moulded parts such as e.g. bottles, flower pots, disposable crockery and cutlery, golf tees, films for packaging for e.g. foodstuffs and biowastes, mulch films, nappies, etc. Moreover, they are suitable for coating flat structures such as e.g. paper, fleece, woven fabrics, knitted fabrics or other substrates or for the preparation of fibre blends and laminates and also fibrous composites. Corresponding materials are also suitable e.g. for paper recycling. The cellulose ether esters according to the invention may also be used as matrix material for formulations of active substances such as e.g. pheromones, fertilisers, fungicides, insecticides, herbicides or nematocides.

The important property according to the invention of full compostability is examined as follows.

The compounds to be tested are clamped as films in 6×6 slide frames and dried at 80° C. until a constant weight is obtained. They are then placed in a suitable box and into in a 2 cm high mixture of shredded flower cuttings (1 part w/w) and well-rotted garden compost (2 parts, w/w). In order to obtain a high humidity, water-filled crystallising dishes are placed on the compost mixture. The filled boxes are incubated in an incubator for 4 successive weeks in each case at 60° C., 50° C. and 37° C. Water losses are determined via the weight loss and made up. The pH of the compost is measured regularly during incubation. If the measured pH deviates by more than one unit from pH 7, the water loss is made up by 100 mM potassium phosphate pH 7.0. After 4 weeks in each case, a batch is interrupted, the films removed, cleaned and dried at 80° C. until a constant weight is obtained. Immediately after drying, the weight loss of the film is determined by another weighing.

In the poisoned control, the batch is dried completely at 105° C. and the water that has evaporated is then replaced by a 0.1% $HgCl_2$ solution. The samples for the poisoned control are placed in the $HgCl_2$ solution before being introduced into the compost mixture and then dried. The control batch is incubated in exactly the same way as the batches to be tested. A substance is then classified as being degradable if no more sample substance can be detected after 12 weeks in the unpoisoned batch but the sample in the poisoned batch is unchanged.

The degrees of substitution can be determined with the usual methods of cellulose derivative analysis such as e.g. Zeisel cleavage, elemental analysis, gas chromatography and $^{13}$C-NMR spectroscopy. Softening points were determined on a heated Kofler bench.

The subject of the present invention will be explained in more detail on the basis of the present examples.

EXAMPLE 1

A suspension of a hydroxypropyl cellulose (75 g/0.36 mol) with a molar degree of substitution (MS) of 0.88 is formed in 675 g of tert.-butanol, 5 g of 1,8-diazabicyclo [5.4.0]undec-7-ene(DBU) are added and the mixture heated to 80° C. After the addition of 154 g (1.07 mol) of L-lactide, the temperature is raised to 140° C., the mixture is stirred for 5 h and the resulting pasty mass is introduced into water. The precipitating product is isolated, washed and dried. 140 g are obtained with a softening point of 160° C. and an MS lactate of 4.01.

EXAMPLE 2

A suspension of a hydroxypropylcellulose (75 g/0.42 mol) with MS hydroxypropyl 0.88 is formed in 675 g of dimethylacetamide, 2 g of DBU are added and the mixture is heated to 80° C. for 2 h. After the addition of 202 g (1.40 mol) of L-lactide, the temperature is raised to 130° C. for 5 h. The mixture is cooled, and the product is precipitated from water, isolated and dried: 195 g, softening range 120°–200° C., MS lactate 6.04, MFR 14.6 g/10 min (220° C./5 kg).

A cast film exhibits the following mechanical properties:

| E modulus | 2899 MPa |
|---|---|
| Elongation at break | 0.9% |
| Ultimate tensile stress | 20.4 MPa |
| Gloss 20° | 115 GE |

The film disintegrates after one month in the film compostability test.

EXAMPLE 3

A suspension of 75 g (0.35 mol) of a hydroxypropyl cellulose with MS 0.88 is formed in 675 g of DMAc, 1 ml of conc. sulphuric acid and 126 g (0.87 mol) of L-lactide are added and the mixture is heated to 130° C. The mixture is stirred for 5 h at 50° C., and the product precipitated from water and dried: 131 g, softening point 165° C., MS lactate 3.23.

A cast-film displays the following mechanical properties:

| E-modulus | 2575 MPa |
|---|---|
| Elongation at break | 3.5% |
| Ultimate tensile stress | 47.1 MPa |

The film disintegrates after one month in the film compostability test.

EXAMPLE 4

8.1 kg of cellulose are suspended in 8.1 kg of isopropyl alcohol and 0.8 kg of water and the suspension is sprayed with 6 kg of 50% sodium hydroxide solution. The mixture is heated to 80° C. and 5.8 kg of propylene oxide are injected thereon. After a reaction time of 2 hours the mixture is cooled neutralised with acetic acid and washed with methanol. A hydroxypropyl cellulose of an MS hydroxypropyl of 0.82 is obtained.

3.86 kg of this hydroxypropyl cellulose are suspended in 30 kg of dimethyl acetamide and 8.2 kg of L-lactide and 0.2 kg of DBU are added. The reaction mixture is stirred for 5 hours at 120° C., precipitated from water and dried. 10 kg of hydroxypropyl cellulose lactate with a melting point of 170° C. and an MS hydroxypropyl of 0.82 and an MS lactate of 3.40 are obtained.

Using the injection-moulding technique the material was processed to form test rods measuring 80×10×4 mm and having the following mechanical properties:

| E modulus: | 3.5 gPa |
|---|---|
| Flexural strength: | 93 MPa |
| Elongation: | 4% |

The test rods disintegrated after 2 months in the compostability test.

EXAMPLE 5

A suspension of 75 g (0.35 mol) of a hydroxypropyl cellulose with MS 0.88 is formed in 675 g of DMAc, 2 g of DBU, 76 g (0.53 mol) of L-lactide and 18 g (0.18 mol) of acetic anhydride are added and the mixture heated to 130° C. The mixture is stirred for 5 h at 130° C., and the product is precipitated from water and dried: 121 g, softening point 200° C., MS lactate+DS-acetate 1.81.

A cast film displayed the following mechanical properties:

| E modulus | 3355 MPa |
|---|---|
| Elongation at break | 2.3% |
| Ultimate tensile strength | 57 MPa |

The film disintegrates after one month in the film compostability test.

EXAMPLE 6

A suspension of 75 g (0.35 mol) of a hydroxypropyl cellulose with MS 0.88 is formed in 675 g of MDAc, 2 g of DBU, 99 g (0.49 mol) of L-lactide and 3.5 g (0.013 mol) of 2-dodecenyl succinic anhydride are added and the mixture is heated to 130° C. The mixture is stirred for 5 h at 130° C., and the product precipitated from water and dried: 121 g, softening point 200° C., MS lactate<2.6.

A cast film displayed the following mechanical properties:

| E modulus | 2833 MPa |
|---|---|
| Elongation at break | 2.9% |
| Ultimate tensile strength | 58 MPa |

The film disintegrates after one month in the film compostability test.

EXAMPLE 7

A suspension of 75 g (0.35 mol) of a hydroxypropylcellulose with MS 0.88 is formed in 675 g of DMAc, 2 g of DBU, 76 g (0.53 mol) of L-lactide and 45 g (0.35 mol) of propionic anhydride are added and the mixture heated to 130° C. The mixture is stirred for 5 h at 130° C., and the product is precipitated from water and dried: 121 g, softening point 155° C.

A cast film displayed the following mechanical properties:

| E modulus | 2913 MPa |
|---|---|
| Elongation at break | 2.7% |
| Ultimate tensile strength | 54 MPa |

The film disintegrates after one month in the film compostability test.

EXAMPLE 8

A suspension of 75 g (0.35 mol) of a hydroxypropyl cellulose with MS 0.88 is formed in 675 g of DMAc, 2 g of DBU, 76 g (0.53 mol) of L-lactide and 52 g (0.35 mol) of phthalic anhydride are added and the mixture is heated to 130° C. The mixture is stirred for 5 h at 130° C. and the product precipitated from water and dried: 112 g, softening point 195° C.

We claim:

1. Thermoplastic, water-insoluble and fully compostable cellulose ether esters which can be described by the general structure

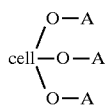

wherein cell-O represents the substituted radical of a hydroxyl group on the cellulose chain, at least one of the groups A is a 2-hydroxycarboxylic acid having the structure (II)

in which, $D_1$ and $D_2$ independently of one another stand for a hydrogen atom or a methyl or ethyl group, m stands for an integer from 1 to 10, at least one further group A is a monocarboxylic acid, a dicarboxylic acid or a carbamate group, and any remaining group A is hydrogen.

2. A process for the preparation of thermoplastic, water-insoluble and compostable cellulose ether esters according to claim 1, characterized in that a cellulose ether is caused to react in an organic solvent in the presence of a basic or acid catalyst with the dimer of a 2-hydroxycarboxylic acid and with oligomers of 2-hydroxycarboxylic acids, and in that the isolation of the cellulose ether ester takes place by evaporation of the solvent or by precipitation.

3. A process for the preparation of thermoplastic, water-insoluble and compostable cellulose ether esters according to claim 2, characterised in that a cellulose ether is caused to react in an organic solvent in the presence of a basic or acid catalyst with the dimer of a 2-hydroxycarboxylic acid and with a monocarboxylic or dicarboxylic anhydride or an isocyanate, and in that the isolation of the cellulose ether ester takes place by evaporation of the solvent or by precipitation.

4. Thermoplastic, water-insoluble and biodegradable cellulose ether esters according to claim 1, wherein the 2-hydroxycarboxylic acid group having the general structure (II) is a monomeric or oligomeric lactic acid group with a molecular degree of substitution per anhydroglucose repeating unit of >3.

5. Thermoplastic, water-insoluble and compostable cellulose ether esters according to claim 1, wherein the monocarboxylic acid group is an acetic acid, propionic acid or butyric acid group, the dicarboxylic acid group is a phthalic acid, maleic acid or alkenyl succinic acid group, and the carbamate group is a butyl or stearyl carbamate group.

6. Thermoplastic, water-insoluble and compostable cellulose ether esters according to claim 1, wherein the 2-hydroxycarboxylic acid group having the general structure (II) is a monomeric or oligomeric lactic acid group and the monocarboxylic acid group is an acetic acid, propionic acid or butyric acid group, the dicarboxylic acid group is a phthalic acid, maleic acid or alkenyl succinic acid group, and the carbamate group is a butyl or stearyl carbamate group.

7. Thermoplastic, water-insoluble and compostable cellulose ether esters according to claim 1, wherein the 2-hydroxycarboxylic acid group having the general structure (II) is a monomeric or oligomeric lactic acid group and the monocarboxylic acid group is an acetic acid, propionic acid or butyric acid group, the dicarboxylic acid group is a phthalic acid, maleic acid or alkenyl succinic acid group, and the carbamate group is a butyl or stearyl carbamate group.

8. Thermoplastic, water-insoluble and fully compostable cellulose ether esters which can be described by the general structure

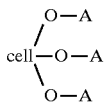

wherein cell-O represents the substituted radical of a hydroxyl group on the cellulose chain, at least one of the groups A is a 2-hydroxycarboxylic acid having the structure (II).

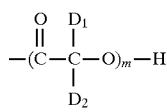

in which $D_1$ and $D_2$ independently of one another stand for a hydrogen atom or a methyl or ethyl group, m stands for an integer from 1 to 10, at least one of the groups A is a methyl, ethyl, benzyl, or cyanoethyl, and any remaining group A is hydrogen.

9. Thermoplastic, water-insoluble and biodegradable cellulose ether esters according to claim 8, wherein the 2-hydroxycarboxylic acid group having the general structure (II) is a monomeric or oligomeric lactic acid group with a molecular degree of substitution per anhydroglucose repeating unit of >3.

10. Thermoplastic, water-insoluble and compostable cellulose ether esters according to claim 8, wherein the monocarboxylic acid group is an acetic acid, propionic acid or butyric acid group, the dicarboxylic acid group is a phthalic acid, maleic acid or alkenyl succinic acid group, and the carbamate group is a butyl or stearyl carbamate group.

* * * * *